(12) United States Patent
Miyahara et al.

(10) Patent No.: US 7,857,951 B2
(45) Date of Patent: Dec. 28, 2010

(54) WATER PURIFICATION APPARATUS

(75) Inventors: Takakazu Miyahara, Minami-Satsuma (JP); Terumasa Miyahara, Minami-Satsuma (JP)

(73) Assignee: Elm Inc., Kagoshima (JP)

( * ) Notice: Subject to any disclaimer, the term of this patent is extended or adjusted under 35 U.S.C. 154(b) by 1077 days.

(21) Appl. No.: 11/596,727

(22) PCT Filed: May 20, 2004

(86) PCT No.: PCT/JP2004/006848
§ 371 (c)(1),
(2), (4) Date: Nov. 16, 2006

(87) PCT Pub. No.: WO2005/113449
PCT Pub. Date: Dec. 1, 2005

(65) Prior Publication Data
US 2008/0053822 A1    Mar. 6, 2008

(51) Int. Cl.
*C02F 1/48* (2006.01)
(52) U.S. Cl. .............. 204/272; 204/275.1; 204/276; 204/278
(58) Field of Classification Search ............ 204/272, 204/275.1, 276, 278
See application file for complete search history.

(56) References Cited

U.S. PATENT DOCUMENTS 4,293,400 A    10/1981    Liggett 6,689,271 B2 *    2/2004    Morkovsky et al. ......... 205/757

FOREIGN PATENT DOCUMENTS

| JP | 55-137998 | 10/1980 |
| JP | 08-132051 A | 5/1996 |
| JP | 2000-135489 A | 5/2000 |
| JP | 2001-157894 A | 6/2001 |
| JP | A-2001-208427 | 8/2001 |
| JP | 2004-066010 A | 3/2004 |
| JP | 2004-167410 A | 6/2004 |

* cited by examiner

*Primary Examiner*—Arun S Phasge
(74) *Attorney, Agent, or Firm*—Oliff & Berridge, PLC

(57) ABSTRACT

The present invention intends to provide a water purification apparatus that is small and easy-to-use, yet being capable of efficiently creating flocs of impurities and removing the impurities from the wastewater in a single pass. To achieve this objective, an inner tubular anode 12 made of stainless steel or carbon is inserted into an outer tubular cathode 11 made of aluminum, leaving a predetermined intermediate space 13 between them, and electrolysis is carried out to produce aluminum hydroxide. The aluminum hydroxide thus produced serves as the medium for flocculating the impurities in the wastewater ascending the intermediate space 13. The wastewater containing the flocs of impurities is filtrated with a filter 18 within a filtering and settling tank 17. As a result, the impurities are completely removed from the wastewater.

5 Claims, 4 Drawing Sheets

(A)

(B)

(C)

(A)　(B)　(C)

(D)

WATER PURIFICATION APPARATUS

TECHNICAL FIELD

The present invention relates to an apparatus for purifying wastewater resulting from a process of polishing an optical disk or similar objects so that the water can be reused.

BACKGROUND ART

Information recorded on compact disks (CDs), digital versatile disks (DVDs) or other types of optical disks can be read out by casting a laser beam through the readout surface onto the information layer and detecting the beam reflected by the information layer. Therefore, if a scratch is present on the readout surface, the information cannot be correctly read out because the readout beam is scattered by the scratch.

However, presence of a scratch on the readout surface does not damage the information itself because the actual information is not recorded on the readout surface. Accordingly, the readout surface is polished to remove the scratch and thereby restore the optical disk so that the information can be read out again. Usually, this polishing process is continued until the readout surface becomes as smooth as a mirror surface.

Conventional processes for polishing optical disks can be categorized into two types: dry process and wet process.

A dry polishing is a process of polishing an optical disk in the air, using a polishing liquid (e.g. a liquid compound) and a polishing body (called a "buff") made of a cloth, felt, sponge or similar materials. By the dry polishing process, removing deep scratches are impossible, or time-consuming even if it is possible. Therefore, it is necessary to perform a rough sanding process using abrasives or a similar sanding body before the mirror-polishing process. However, since the rough sanding process produces a frictional heat or causes the clogging of the sanding body with shavings, it is still difficult to remove deep scratches in a short period of time.

Accordingly, in recent years, wet polishing processes have become more popular. In the wet polishing process, water containing a surfactant or similar chemicals (called "sanding agent" hereinafter) is supplied on the interface between the optical disk and the polishing body. The use of the sanding agent effectively reduces the frictional heat during the sanding process and removes the shavings from the interface, so that even a deep scratch can be removed in a short period of time.

In the wet polishing process using the sanding agent, the resulting wastewater contains impurities, such as the polishing liquid, shavings and abrasive grains have come off the polishing body. Therefore, in most cases, the wastewater is disposed of, without being recycled.

The wastewater containing the aforementioned impurities must be disposed of as industrial waste. However, its disposal is not so easy now since the restriction on the disposal of industrial waste has been tightened. Furthermore, in some areas where tap water is hard water (e.g. Okinawa in Japan, Europe or China), it is not cost-effective to dispose of the wastewater that has been used only once, because soft water must be costly purchased for use in the sanding agent.

Accordingly, for the purpose of recycling the wastewater, an apparatus for removing the impurities from the wastewater with a filter has been introduced. In such an apparatus, the filter needs to have a mesh size of about 1 µm to remove polishing particles having a diameter of 5 µm or smaller, which originate from the polishing liquid and are finally discharged with the wastewater. This requirement leads to the problem that the filter is easily clogged in a short period of time if the wastewater is filtered without undergoing any pre-processing.

One solution to prevent the clogging of the filter is to treat the wastewater so that the impurities contained in it are cohered into larger grains (or 'flocs') that can be removed with a filter having a larger mesh size. A known method for creating flocs of imputes uses a flocculant.

However, this approach has some problems. Firstly, it requires some operations, including the steps of controlling the amount of the flocculant according to the amount of the wastewater, stirring the wastewater after the flocculant is added, and leaving the stirred wastewater untouched for some time. Secondly, this approach needs at least two separate tanks, one for holding the wastewater and another for holding the flocculant. This construction makes the apparatus larger. Finally, the surfactant added to the wastewater may impede the flocculation process, or a portion of the flocculant may absorb the surfactant.

A more advantageous method for creating flocs of impurities uses electrolysis. In this method, which is called the electroflocculation, aluminum ions are eluted from an aluminum electrode during the electrolytic process, and the released ions react with the hydroxyl ions to produce aluminum hydroxide. The flocculating action of the aluminum hydroxide creates flocs of the impurities.

There are some documents disclosing water purification apparatuses based on the above-described principle. For example, Patent Document 1 discloses a device for purifying water discharged from a bathtub, using the electrolysis of aluminum. Patent Document 2 discloses a water cleansing method in which the electrolysis of wastewater using aluminum and iron plates is combined with a membrane separation technique. Patent Document 3 discloses an electrolysis type turbid water treatment apparatus using an auxiliary electrode consisting of small chips of aluminum obtained from used cans.

[Patent Document 1] Unexamined Japanese Patent Publication No. H08-132051 (Japanese Patent No. 2871490), "Water Purifying Device", Paragraph 0021 and FIG. 1 etc.

[Patent Document 2] Unexamined Japanese Patent Publication No. 2001-157894, "Water Cleansing Method"

[Patent Document 3] Unexamined Japanese Patent Publication No. 2004-66010, "Electrolysis Type Turbid Water Treatment Apparatus"

DISCLOSURE OF THE INVENTION

Problems to be Solved by the Invention

For the wastewater purification apparatus using the electroflocculation, it is necessary to help the creation of flocs by efficiently producing the flocculation medium, i.e. aluminum hydroxide, and/or flocculating the impurities with the resultant aluminum hydroxide.

In general, the use of the electroflocculation requires the separation of the flocculation tank and the filtration tank, so that the apparatus tends to be large. Therefore, it is necessary to reduce the size of the apparatus so that it can be easy to use.

For normal types of water purification apparatuses, such as the one disclosed in Patent Document 1, presence of a small amount of impurities in the recycled wastewater is least problematic. In contrast, if wastewater is to be reused for the polishing of optical disks or a similar process that should create a highly smooth surface (i.e. mirror surface), it is necessary to completely remove the impurities in one cycle of filtering option (or a single "pass"). To satisfy this requirement, the current density (i.e. the amount of current per unit area of the electrode used) needs to be about 10 to 200 times as high as that used in normal electroflocculation apparatuses. Such a current setting causes an accordingly rapid deterioration of the electrodes. Thus, for a wastewater treatment apparatus used with an optical disk polishing system, it is essential to take measures for slowing the deterioration of the electrodes and to provide the system with a mechanism that enables the electrodes to be easily checked for deterioration and replaced.

To solve the above problems, the present invention intends to provide a water purification apparatus that is small and easy-to-use, yet being capable of efficiently creating flocs of impurities and removing the impurities from the wastewater in a single pass. It also provides a water purification apparatus having a device for facilitating the exchange of electrodes and other maintenance operations.

Means for Solving the Problems

Thus, the present invention provides a water purification apparatus, which is characterized in that it includes:
a) a flocculating means having a tube-shaped inner electrode inserted into a tube-shaped outer electrode with its lower end closed, in which:
    the internal space of the inner electrode communicates with the intermediate space between the two electrodes at a lower position;
    the intermediate space communicates with the outside of the outer electrode at a higher position;
    the outer electrode is made of a material containing aluminum and functions as the anode for electrolyzing an upward flow of water through the intermediate space in order to flocculate impurities contained in the water; and
b) a filtering means, located outside the outer electrode, for removing the impurities flocculated by the flocculating means.

In the water purification apparatus according to the present invention, the water (wastewater) containing impurities is supplied to the flocculating means and flows upwards through the intermediate space between the tube-like outer and inner electrodes of the flocculating means. The outer electrode is made of a material containing aluminum. Using the outer electrode as the anode and the inner electrode as the cathode, a direct voltage is applied between the two electrodes. As a result, aluminum ions are eluted from the aluminum component of the anode into the wastewater. The aluminum ions thus eluted react with the hydroxyl ions in the wastewater to form aluminum hydroxide.

The aluminum hydroxide is positively charged and the impurities in the waster are negatively charged. Therefore, the aluminum hydroxide acts as the medium for helping the impurities to form flocs. The diameter of the flocs thus formed ranges from tens to hundreds micrometers.

On the surface of the cathode, hydrogen bubbles are produced. These bubbles stir the upward flow of the wastewater through the intermediate space between the pair of tube-shaped electrodes. The bubbles also adsorb impurities (including the flocculated ones) in the wastewater onto their surface and carry them to the water surface. This phenomenon is called the air-lift effect.

Pre-adding a surfactant to the wastewater (or the sanding agent used earlier) prevents the bubbles from being immediately destroyed upon reaching the water surface; they remain on the water surface for some time. Meanwhile, the impurities adsorbed by the bubbles gradually moves on the surface of the bubbles until they gather at the intersection lines or points of three or more bubbles. Thus, the flocculation of the impurities proceeds more efficiently. To actively utilize this effect of the bubbles that helps the flocculation of the impurities, it is desirable to leave an appropriate volume of space above the water surface.

Then, the bubbles on the water surface are ruptured one after another due to a contact with the inner surface of the filtration tank or other element or an increase in the weight of the impurities flocculated at the aforementioned intersection lines or points. When the bubbles ar ruptured, the flocculated impurities settle down in the water, forming an even larger mass. As a result, it becomes easier to filter the wastewater with the filtering means, which is described later.

The wastewater containing the flocs is filtered with the filtering means to remove the flocs from the wastewater and thereby purify the wastewater. Since the diameter of the flocs is within the range from tens to hundreds micrometers, it is possible to make the filtering means of a non-woven fabric or similar material having a relatively large mesh size.

As stated earlier, the water purification apparatus according to the present invention electrolyzes water using an electrode containing aluminum as the anode. This electrode gradually deteriorates during its usage. Particularly, as in the case of a wastewater purification apparatus used with an optical disk polishing system, if the water needs to be highly purified in a singe pass, the current density (i.e. the amount of current per unit area of the electrode) becomes very high. The water purification apparatus according to the present invention deals with this problem by choosing the outer electrode of a large-volume as the aluminum-containing electrode. This construction reduces the frequency of exchanging the electrode. Examples of the inner electrode include a metallic tube made of a stainless steel or other metals and a graphite tube.

The flocculating means, which includes the electrolyzing unit consisting of the inner and outer electrodes, should be preferably set within the filtering means. This construction contributes to the reduction in the overall size of the apparatus. Containing the electrolysis unit within the filtering means also eliminates the necessity of providing an additional casing that encloses the outer electrode, allowing the aluminum-containing electrode to remain uncovered within the filtering means.

EFFECT OF THE INVENTION

In the water purification apparatus according to the present invention, the hydrogen bubbles produced at the ode of the pair of tube-like electrodes adsorb the impurities in the waste onto their surfaces and move upward through the intermediate space between the two electrodes (air-lift effect) until they reach the water surface. While floating on the water sure, these bubbles help the flocculation of the impurities adsorbed on their surfaces.

The upward motion of the hydrogen bubbles through the intermediate space between the tube-shaped electrodes also has the effect of actively siring the wasted which is also moving upwards through the same space. The sag action gives the impurities in the wastewater more chance of coming closer to each other to flocculate, thus improving the efficiency of flocculating the impurities in the wastewater.

In the water purification apparatus according to the present invention, the highly efficient flocculation of the impurities in the wastewater makes it possible to sufficiently remove the impurities from the wastewater in a single pass by using electrodes having large areas and increasing the density of the current supplied to the electrodes.

Since the aluminum-containing electrode, which deteriorates due to the electrolysis, is located at an outer position, it is possible to increase the volume of the aluminum-containing electrode and thereby decrease the frequency of exchanging the electrode. If the outer electrode (i.e. the aluminum-containing electrode) is used in an uncovered state without having any casing enclosing it, the user can clearly determine the timing of exchanging the electrode and the exchanging work is easy.

In the water purification apparatus according to the present invention, the tube-shaped inner electrode is inserted into the tube-shaped outer electrode within the flocculating means. This construction contributes to the compactness of the flocculating means while allowing the electrodes to have large areas. Setting this flocculating means with the electrodes into the filtering means makes the present apparatus much smaller. With its size thus reduced, the present apparatus can be installed in a store, an office or a similar place having a relatively small space, so that it is easy to use.

The water purification apparatus according to the present invention is particularly suitable for treating the wastewater from an optical disk polishing system to reuse it. Naturally, it is allowable to use the apparatus for purifying water from any other sources.

Figure 1:
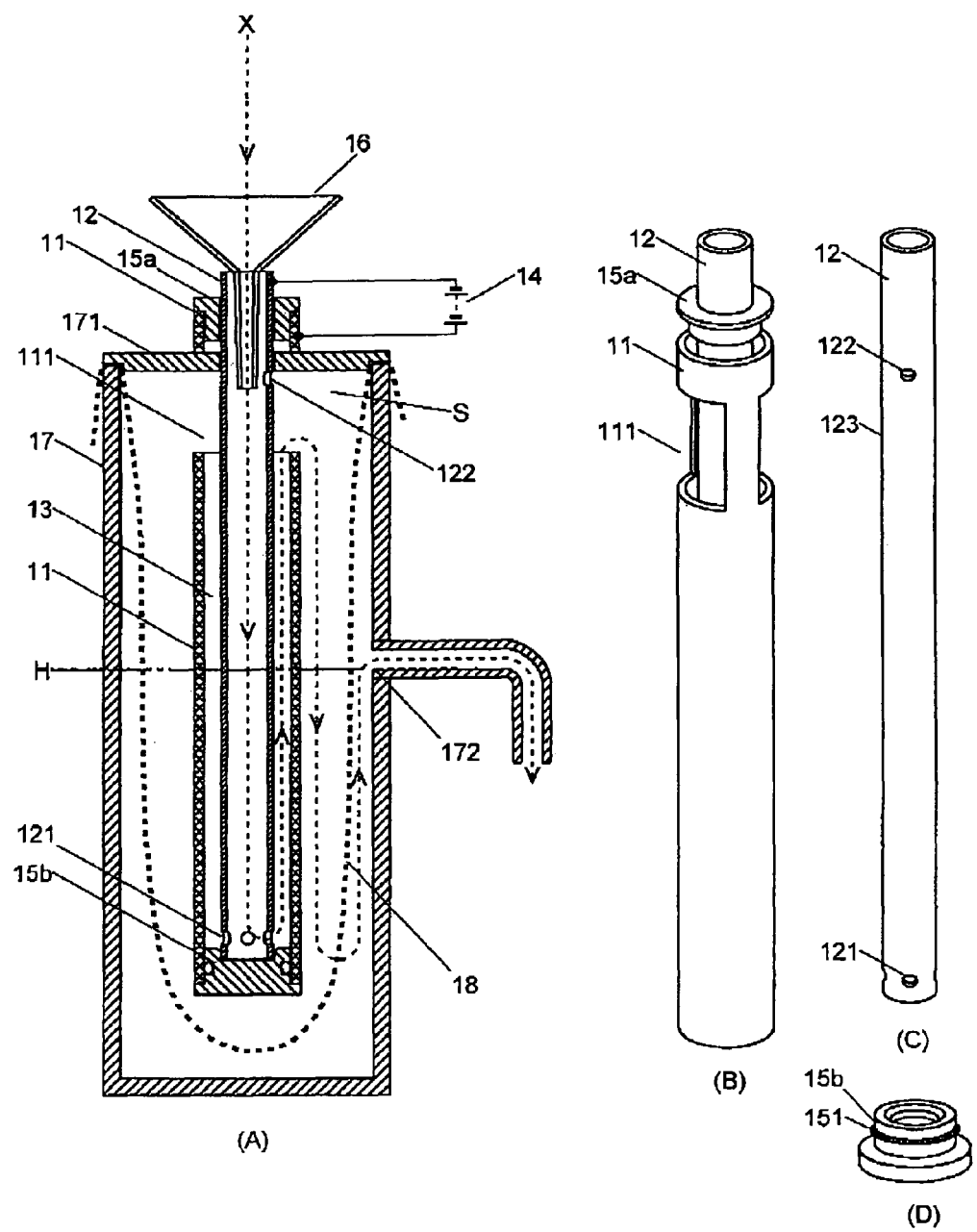
FIG. 1 shows: (A) a sectional view of a wastewater purification apes as the first embodiment of the present invention; (B) a perspective view of a flocculating unit consisting of inner and outer electrodes located within the wastewater purification apparatus; (C) a perspective view of the inner tubular electrode; and a perspective view of a spacer fixed to both tubular electrodes.

EXPLANATION OF NUMERALS 11, 21 . . . Outer Tubular Electrode (Anode)
31 . . . Inner Tubular Electrode (Anode)
12, 22 . . . Inner Tubular Electrode (Cathode)
32 . . . Outer Tubular Electrode (Cathode)
111 . . . Opening
121, 352 . . . Water-Passing Hole
122 . . . Bypass
13 . . . Intermediate Space
14 . . . DC Power Supply
15a . . . Upper Spacer
15b, 25b, 35b . . . Lower Spacer
151, 351 . . . Sealant
16 . . . Funnel
17 . . . Filtering and Setting Tank
171 . . . Cover
172 . . . Outlet
18 . . . Filter
23 . . . Casing
H . . . Water Surface
S . . . Space

BEST MODES FOR CARRYING OUT THE INVENTION

As the first embodiment of the water purification apparatus according to the present invention, a wastewater purification apparatus for an optical disk polishing system is described with reference to the attached drawings. As shown in FIG. 1(A), in the present embodiment, the flocculating means for flocculating impurities in the wastewater uses an electrolysis device having an outer tubular electrode 11 made of aluminum with an opening at its upper end, into which an inner tubular electrode 12 made of a metal (e.g. stainless steel), carbon or other conductive materials are inserted, leaving a predetermined intermediate space 13. In this electrolysis device, a direct voltage is applied between the two electrodes 11 and 12, using the outer tubular electrode 11 as the anode and the inner tubular electrode 12 as the cathode. The upper spacer 15a attached to the upper end of the inner tubular electrode 12 and the lower spacer 15b held at the lower end of the outer tubular electrode 11 determine the position of the two tubular electrodes 11 and 12 so that they are concentrically arranged, leaving a predetermined space between them. These spacers also electrically insulate the two electrodes.

A funnel 16 is set on the upper end of the inner tubular electrode 12. The wastewater introduced from the funnel 16 into the inner tubular electrode 12 is supplied into the intermediate space 13 through the water-passing holes 121 formed at the lower end of the inner tubular electrode 12. It is allowable to replace the funnel 16 with a pipe, a hose or any other tool that can be used for introducing wastewater into the inner tubular electrode 12.

The inner tubular electrode 12 also has a bypass (drain hole) 122 in its upper section. If air bubbles are mixed in the waste introduced from the upper end of the inner tubular electrode 12, the air will be trapped in the upper section of the inner tubular electrode 12. The trapped air may impede the introduction of the wastewater. Moreover, it may suddenly escape from the upper end of the inner tubular electrode 12 and simultaneously cause the wastewater to spout and contaminate the surrounding area. The bypass 122 prevents this problem by discharging the introduced air to the outside before it is trapped. The bypass 122 is also effective for preventing the wastewater from flowing over the top of the inner tubular electrode 12 when the electrode 12 is clogged. The water-passing holes 121 and the bypass 122, which are circular in FIG. 1, may have a different shape, such as a polygon. The number of each hole, which is four for the water-passing hole 121 and one for the bypass in FIG. 1, can be also changed as desired.

The outer tubular electrode 11 has two openings 111 in its upper section. The wastewater introduced into the intermediate space 13 moves upwards through the space 13 and then flows over the openings 111 into the filtering and settling tank 17. The bubbles containing the impurities also flows over the openings 111 and enter an open space S located at a level higher than the lower end of the opening 111. This space S allows a considerable amount of bubbles to be densely collected. The shape and number of the openings 111 may be different from what is shown in FIG. 1, i.e. two, rectangular openings.

The wastewater that has flown over the openings 111 into the filtering and setting tank 17 is then filtrated by the filter 18, taming into clear water free from impurities or flocs. This water is extracted from the outlet 172. The clear water thus produced is reused to prepare a sanding agent. The filter 18 may fail to catch a minute amount of impurities or fine flocs, allowing them to settle at the bottom of the filtering and settling tank 17. Therefore, it is preferable to provide the outlet 172 in the middle of the filtering and settling tank 17, rather than at a position close to the bottom.

FIG. 1(D) is a perspective view of the lower spacer 15b held at the lower end of the outer tubular electrode 11. In the wastewater purification apparatus of the present embodiment the outer tubular electrode 11 is the anode made of aluminum. It deteriorates due to the electrolysis and needs to be exchanged at an appropriate timing. Therefore, the outer tubular electrode 11 has an easy-to-detach structure, having a sealant 151 consisting of an O-ring or other members that prevents untreated wastewater from leaking from the lower end of the outer tubular electrode 11. In FIG. 1, the lower spacer 15b is held in the tubular electrode 11 by the elastic force of the sealant 151. Alternatively, it is possible to use a thread, a hose band or other tools to connect the two components.

Figure 2:
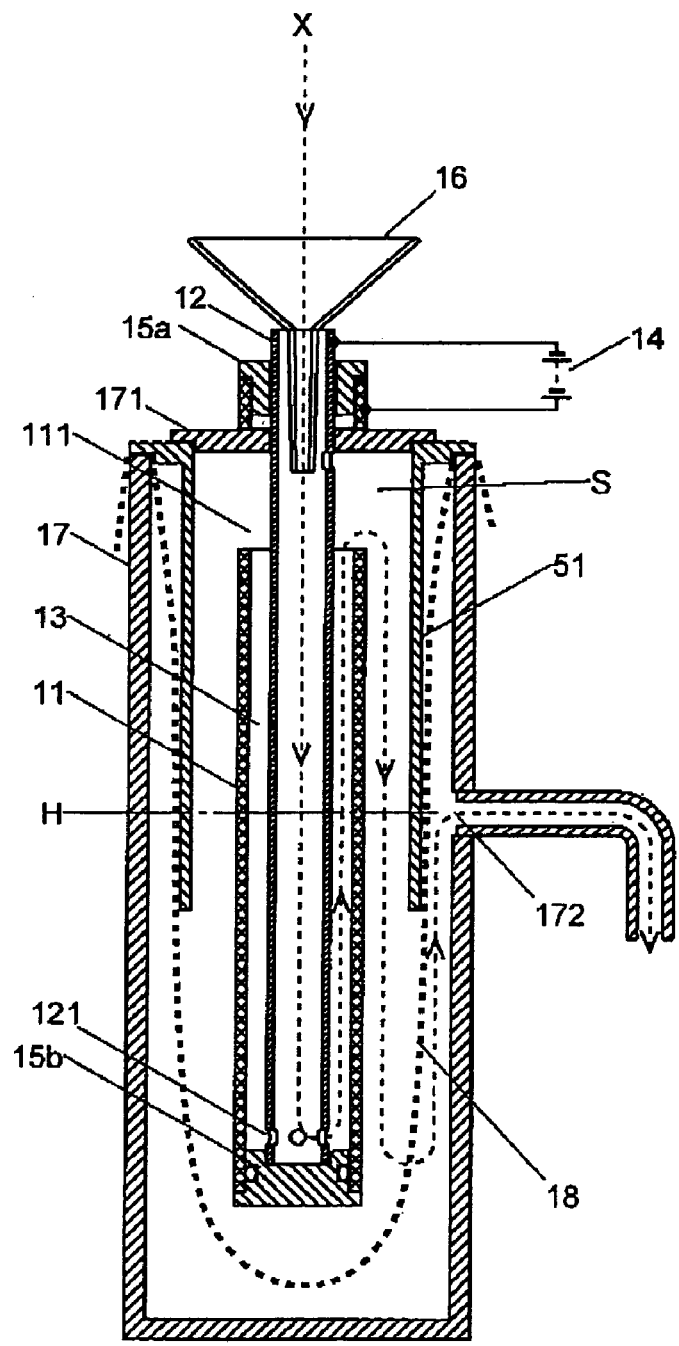
FIG. 2 is a sectional view of a water purification apparatus as the second embodiment of the present invention.

Next, a wastewater purification apparatus as the second embodiment of the present invention is described with reference to FIG. 2. The basic structure of the second embodiment is the same as that of the first embodiment; the difference exist in that the present embodiment has a partition wall 51 between the flocculating unit and the filter 18. The partition wall 51 is designed so that it reaches a position lower than the outlet 172 located in the middle of the sidewall of the filtering and settling tank 17. The wastewater that has flown over the openings 111 into the filtering and settling tank 17 descends the intermediate space between the flocculating unit and the partition wall 51 without immediately touching the filter 18. Meanwhile, the flocs of impurities formed within the flocculating unit are temporarily trapped in the intermediate space because they contain small bubbles of hydrogen or other gas and accordingly weigh less than the water. While being trapped, the flocs collect more impurities and grow larger. Later, they release the bubbles and start to sink. Thus, the provision of the partition wall 51 enables the filter 18 to catch the flocs more assuredly.

Figure 3:
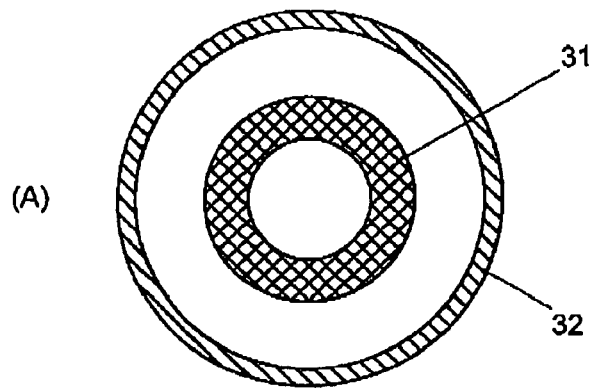
FIG. 3 shows horizontal sectional views of flocculating units having different structures, where example (A) uses an inner tubular electrode made of aluminum, example (B) uses an outer tubular electrode made of aluminum and enclosed in a casing, and example (C) uses an the outer electrode made of aluminum, which exposed by omitting the casing.
Figure 3:
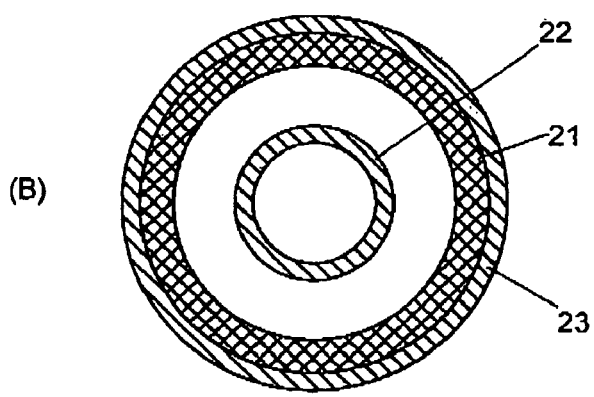
Figure 3:
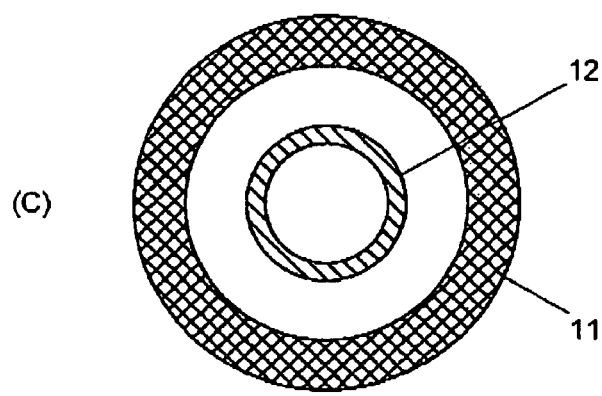

Nex with reference to FIG. 3, several variations of the wastewater purification apparatus are described and the effects of the present invention upon the wastewater purification are explained. FIG. 3(A) shows an example of the flocculation unit or electrolytic unit of the water purification apparatus, which has an outer tubular electrode 32 made of a metal (e.g. stainless steel), carbon or other conductive materials and an inner tubular electrode 31 made of aluminum. In this example, the inner tubular electrode 31 is the anode and the outer tubular electrode 32 is the cathode. FIG. 3(B) shows another example with the inner aud outer materials exchanged and the anode and the cathode transposed; that is, the outer tabular electrode 21 is made of aluminum and the inner tubular electrode 22 is made of a metal (e.g. stress steel), carbon or other materials. Further, in this example is that the outer tubular electrode 21 is enclosed in a metallic or non-metallic casing 23. Comparing the two examples (A) and (B) immediately proves ta the volume of aluminum per unit length, which is consumed by electrolysis, is several times larger in (B) where the aluminum is used as the outer electrode 22, so that the frequency of exchanging the electrode can be lower. From the structural point of view, the structure in (A) having two elements is simpler than the structure in (B) having three elements. Furthermore, the independent positioning of the inner aluminum electrode 31 in (A) accepts a simple power-supplying mechanism and makes the exchanging work easier. In contrast, the outer aluminum electrode 21 in (B) quires a complex power-supplying mechanism because it is enclosed in the casing 23. Moreover, the exchanging work will include the troublesome steps of removing and attaching the casing 23. Another problem common to both structures in (A) and (B) is that the aluminum electrode is barely observable from the outside, the user may fail to notice an appropriate timing of exchanging the aluminum electrode deteriorated due to electrolysis.

The example of FIG. 3(C) is identical to (B) in that the inner electrode 12 is made of a metal (e.g. stainless steel), carbon or other conductive materials. However, it does not have any casing enclosing the outer electrode 11. As a result, the unit has a simple, two-element structure. Lack of the casing 23 makes it possible to use an outer electrode 11 whose volume is larger than that in (B), while ensuring the same intermediate space between the outer electrode 11 and the inner electrode 12 and the same diameter of the electrolysis unit as in the previous two examples. The power supply to the electrode is easy, and the electrode can be exchanged without difficulty. The user can easily check the degree of deterioration of the electrode anytime, for example when the user exchanges the filter 18. If a hole is found in the electrode, it follows that the electrode needs to be exchanged. Thus, the timing of exchanging the electrode can be easily determined.

Figure 4:
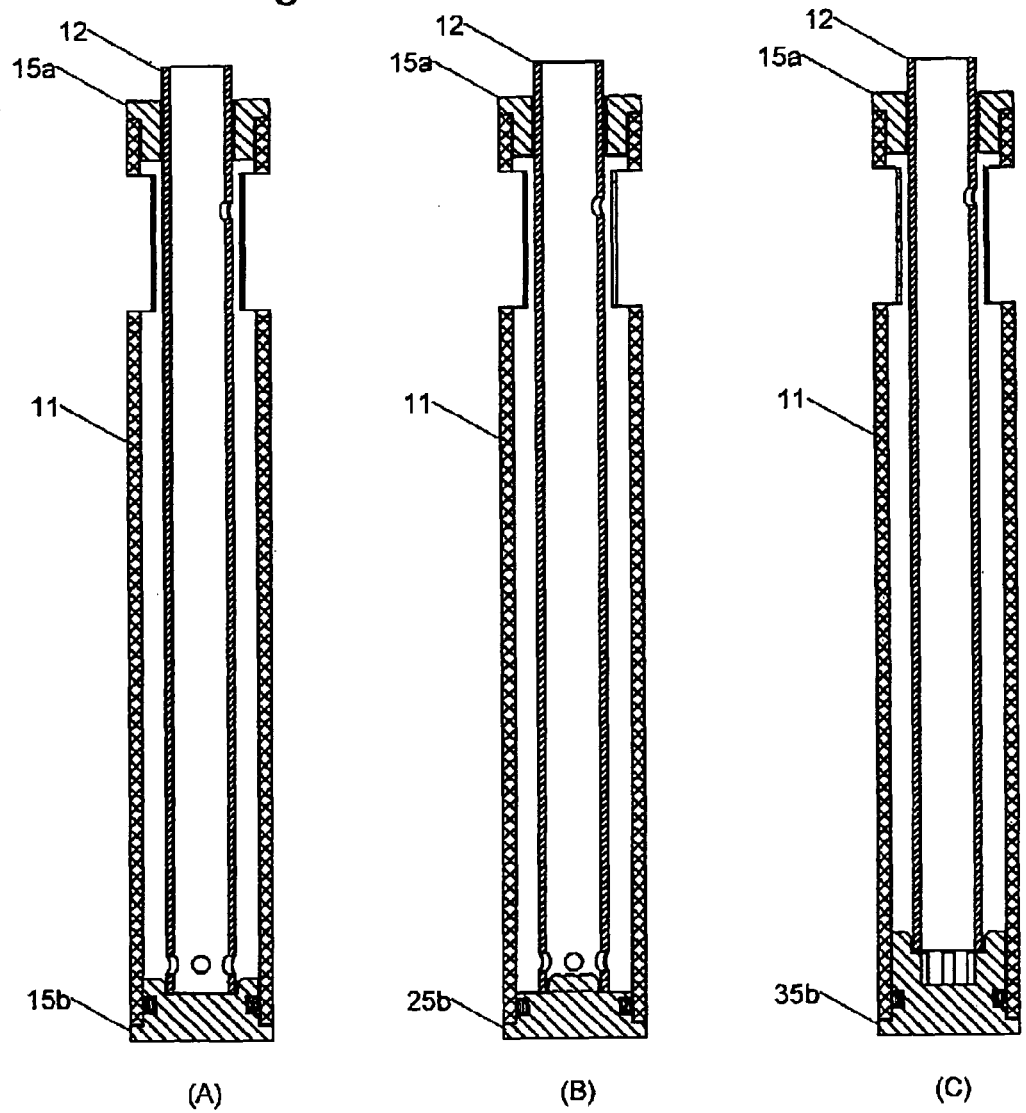
FIG. 4 shows vertical sectional views of flocculating units of the water purification apparatus according to the present invention, where example (A) uses a concave spacer to hold the two tubular electrodes, example (B) uses a convex spacer, and example (C) uses a concave-convex end spacer, and (D) is a perspective view of the concave-convex spacer.
Figure 4:
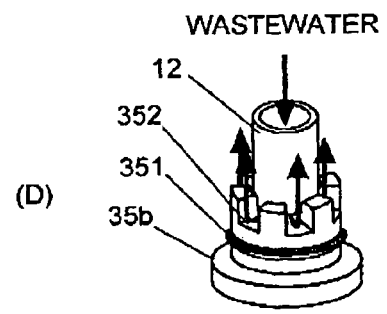

The flocculating unit of the present embodiment can be modified in various forms. FIG. 4(A) is a sectional view of the flocculating unit (electrolysis unit) used in the waste purification apparatuses in FIGS. 1 and 2. This view is a mere reproduction to be referenced for comparison FIG. 4(B) shows another embodiment of the lower spacer 25b. In contrast to the lower spacer 15b in (A), which supports the inner tubular electrode 12 on its outer surface, the present one supports the same electrode on its inner surface. In these two examples, the inner tubular electrode 12 has the water-passing holes 121 at its lower end. In contrast, the inner tubular electrode in (C) has no water-passing hole at its lower end. Instead, the lower spacer 35b has the function of passing water. (D) is a perspective view of the lower spacer 35b, in which the cuts 352 serve as the water-passing holes.

The invention claimed is:

1. A water purification apparatus, which is characterized in that it comprises:
   a) a flocculating means having a tube-shaped inner electrode inserted into a tube-shaped outer electrode with its lower end closed, in which:
      an internal space of the inner electrode communicates with an intermediate space between the two electrodes at a lower position;
      the intermediate space communicates with an outside of the outer electrode at a higher position;
      the outer electrode is made of a material containing aluminum and functions as an anode for electrolyzing an upward flow of water through the intermediate space in order to flocculate impurities contained in the water; and
   b) a filtering means, located outside the outer electrode, for removing the impurities flocculated by the flocculating means.

2. The water purification system according to claim 1, which is characterized in that the flocculating means is located within the filtering means, and the outer electrode is exposed within the filtering means.

3. The water purification system according to claim 2, which is characterized in that a space for trapping hydrogen bubbles produced on the cathode-side tube-shaped electrode is formed above the filtering means.

4. The water purification system according to claim 3, which is characterized in that the filtering means comprises a partition wall between the outer electrode and a filtration membrane, and the partition wall extends down to a level lower than an outlet provided in the filtering means.

5. The water purification system according to claim 2, which is characterized in that the filtering means comprises a partition wall between the outer electrode and a filtration membrane, and the partition wall extends down to a level lower than an outlet provided in the filtering means.

* * * * *